United States Patent [19]

Wurl

[11] Patent Number: 5,085,485

[45] Date of Patent: Feb. 4, 1992

[54] SIDE MEMBER OF A VEHICLE BODY STRUCTURE

[75] Inventor: Willi Wurl, Niefern-Oeschelbronn, Fed. Rep. of Germany

[73] Assignee: Dr. Ing. h.c.F. Porsche Aktiengesellschaft, Fed. Rep. of Germany

[21] Appl. No.: 668,147

[22] Filed: Mar. 11, 1991

[30] Foreign Application Priority Data

Mar. 23, 1990 [DE] Fed. Rep. of Germany ....... 4009401

[51] Int. Cl.⁵ .............................................. B62D 21/00
[52] U.S. Cl. .................................. 296/204; 296/205; 296/188; 296/208; 52/720
[58] Field of Search ............... 296/205, 208, 204, 209, 296/188; 52/720, 731; 138/115, 111, DIG. 11; 428/582, 188; 280/782-786, 796, 797, 798

[56] References Cited

U.S. PATENT DOCUMENTS

| 3,622,195 | 11/1971 | Lautenbach | 296/209 |
| 4,463,057 | 7/1984 | Knürr | 52/720 |
| 4,936,068 | 6/1990 | Victorschöfeld | 52/720 |
| 4,986,597 | 1/1991 | Clausen | 296/205 |

FOREIGN PATENT DOCUMENTS 0146716 12/1988 European Pat. Off. .

Primary Examiner—Robert R. Song
Attorney, Agent, or Firm—Evenson, Wands, Edwards, Lenahan & McKeown

[57] ABSTRACT

A member, particularly a side member of a vehicle body structure, is formed by an extruded section manufactured or light metal which, viewed in the vertical direction, has at least one hollow-section portion. In order to achieve a high energy absorption in the case of an impact shock and for the space-saving connection of an impact-absorbing damper of a bumper arrangement, the member comprises a central tube portion and two outer hollow-section provides which are connected to the tube portion by diagonally extending webs.

18 Claims, 3 Drawing Sheets

SIDE MEMBER OF A VEHICLE BODY STRUCTURE

BACKGROUND AND SUMMARY OF THE INVENTION

The present invention relates to a member, particularly a side member for a vehicle body structure, that is formed by an extruded section made of a light metal which, when viewed in the vertical direction, has at least one hollow-section portion.

From the European Patent Document EP-PS 0 146 716, a body structure for a passenger car is known, the members of which are formed by box-shaped hollow sections made of light metal. The hollow sections are manufactured by the extrusion molding method.

It is an object of the present invention to provide a member of a body structure, particularly a side member arranged adjacent to a vehicle end area, which has a high energy absorption capacity in the event of an impact shock and that also allows an impact absorbing damper of a bumper arrangement to be connected to the side member in a space-saving manner.

This and other objects are achieved by the present invention which provides a member formed by an extruded section made of a light metal and comprises a central tube portion, at least two hollow-section portions arranged on two opposite sides of the tube portion, and diagonally extending webs arranged between the hollow-section portions and the tube portion.

An advantage of the present invention is that by means of the central tube portion, an impact-absorbing damper can be accommodated in the side member in a simple and space-saving manner. Also, by means of the central tube portion and the two outer, approximately square hollow-section portions, a good fold buckling action of the side member is achieved. Thus, in the event of an impact shock, a high energy absorption is achieved.

As a result of the webs between each hollow-section portion and the tube portion which are arranged at approximately a right angle with respect to one another and which are aligned approximately at an angle of 45° with respect to a horizontal auxiliary plane, an operationally appropriate folding-together of the side member is achieved during an impact shock. Because of the continuous tapering of the two lateral boundary edges of the side member in the downward direction, the side members can, in a simple manner, be placed from above into a junction element made of a casting which surrounds them.

The impact-absorbing damper which is inserted into the central tube position extends at a slight radial distance from the exterior tube portion. In the event of a diagonal impact on the side member, a guiding therefore takes place of the impact-absorbing damper through the tube portion.

Other objects, advantages and novel features of the present invention will become apparent from the following detailed description of the invention when considered in conjunction with the accompanying drawings.

DETAILED DESCRIPTION OF THE DRAWINGS

Figure 1:
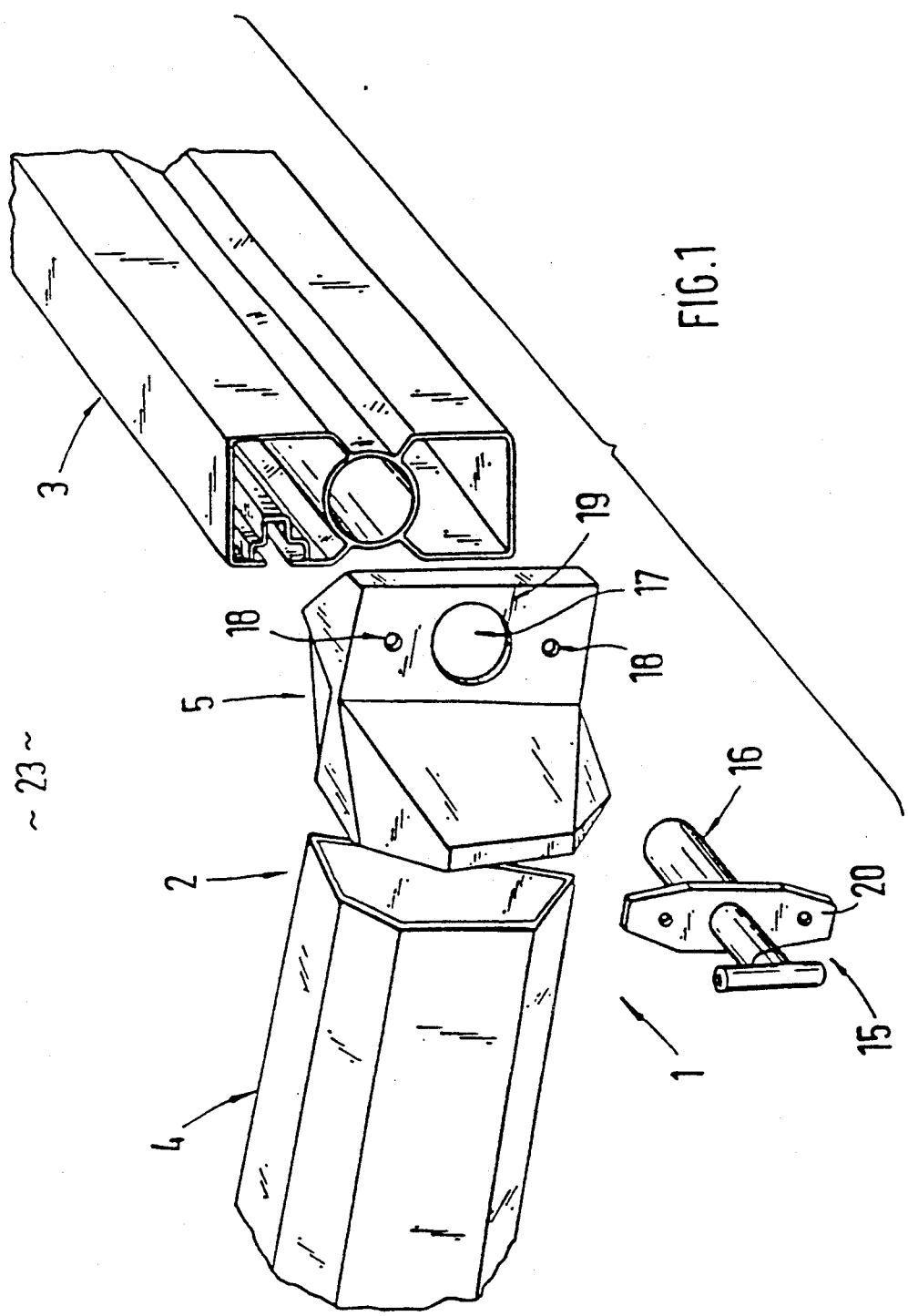
FIG. 1 is a perspective representation of an end area of a body structure of a passenger car with a side member constructed in accordance with an embodiment of the present invention.

In FIG. 1, a forward end area 1 of a body structure 2 of a passenger car is shown which, in the illustrated area, comprises a side member 3 and a cross member 4. The side member 3 and the cross member 4 are formed by a hollow section made of light metal (aluminum, aluminum alloy, magnesium, or the like) and are manufactured by the extrusion molding method, and connected with one another by a junction element 5.

The junction element 5 is formed, for example, by a casting which is manufactured of light metal (aluminum, aluminum alloy, magnesium, or the like).

Figure 2:
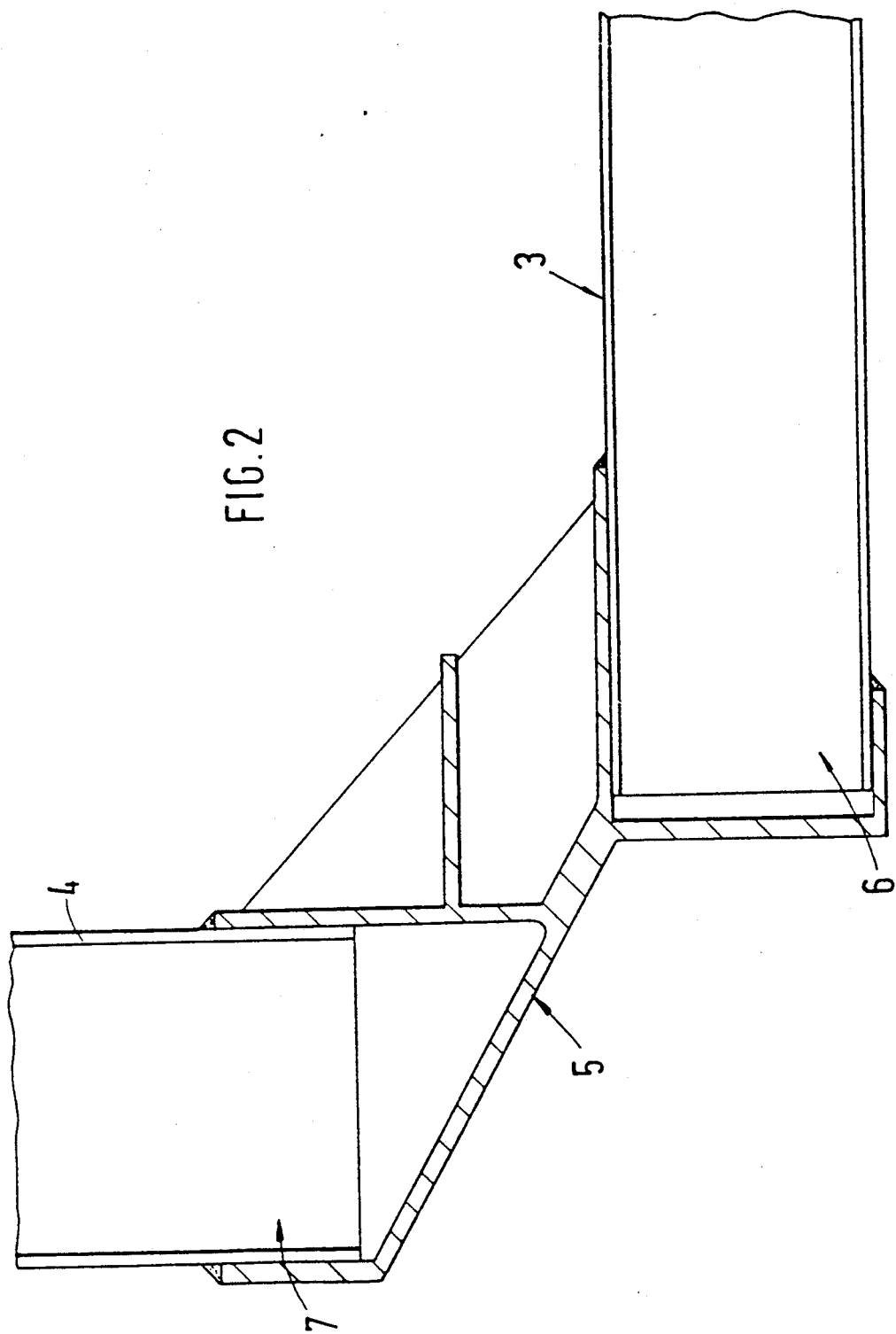
FIG. 2 is a horizontal sectional view through the end-side body structure.

According to FIG. 2, the junction element 5 encloses end areas 6, 7 of the inserted side member 3 as well as of the cross member 4. The junction element 5 is also connected with the members 3, 4 by a mechanical connection (screwing, riveting, or the like), by gluing or by a thermal connection, such as welding.

Figure 3:
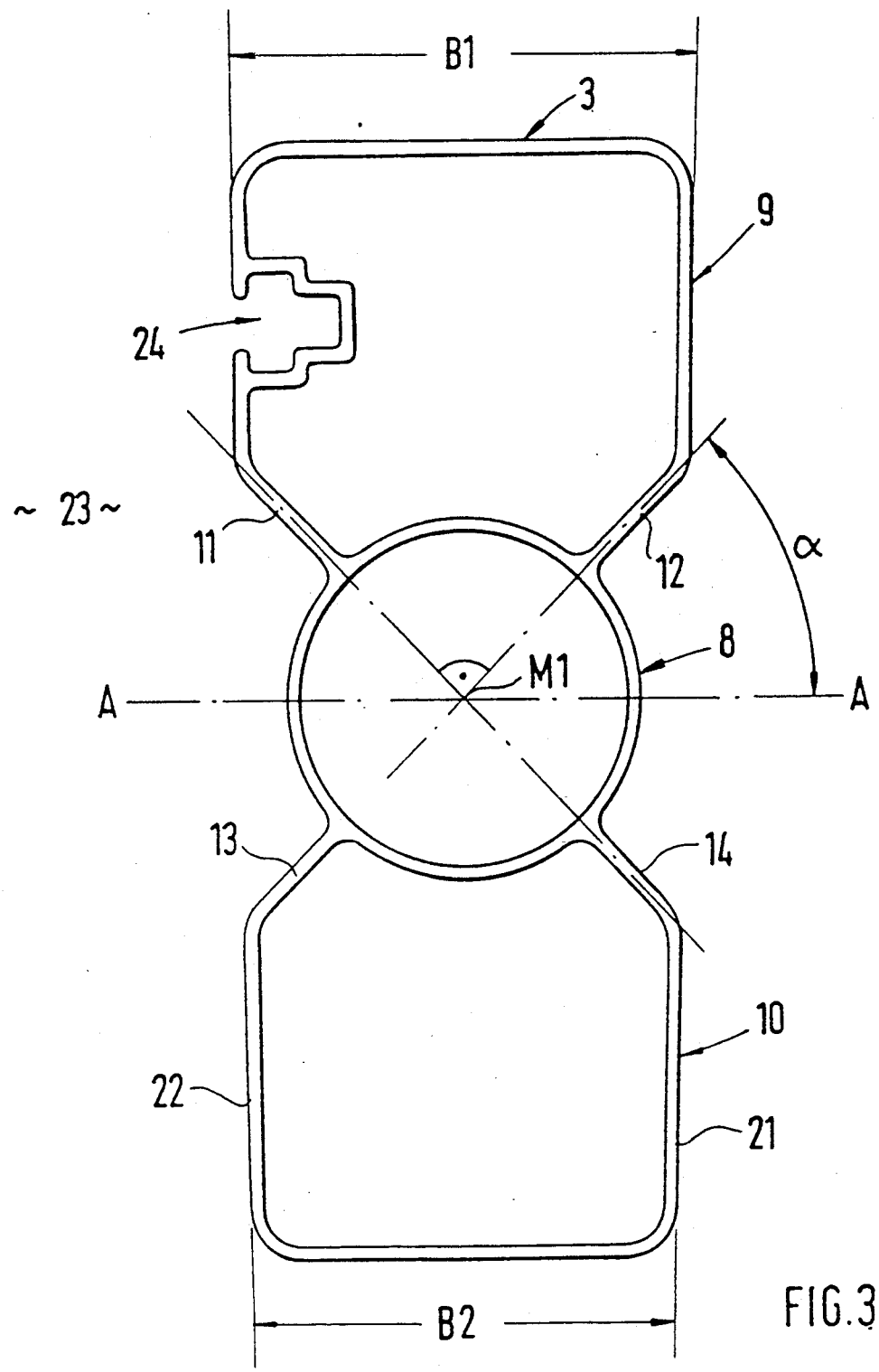
FIG. 3 is a vertical sectional view of the side member of the body structure.

A high energy absorption of the side member 3, in the event of an impact shock, and a space-saving connection of a bumper arrangement to the side member 3 is achieved with the present invention by providing a side member 3 which comprises a central tube portion 8 and two outer hollow-section portions 9, 10 arranged on opposite sides of the tube portion 8. The hollow-section portions 9, 10 are connected to the tube portion 8 by diagonally extending webs 11, 12, 13, 14. According to FIG. 3, the hollow-section portions 9, 10 are arranged below and above the central tube portion 8.

The tube portion 8 has a circular cross-section and is dimensioned such that an impact-absorbing damper 15 with a snug fit, in sections, can be accommodated inside the tube portion 8. A cylindrical portion 16 of the impact-absorbing damper 15 is pushed through an opening 17 of the junction element 5 into the tube portion 8 of the side member 3 and is held in its position on the junction element 5 by means of fastening elements (such as screws) which are not shown in detail. The opening 17 and threaded bores 18 are provided on a vertical wall 19 of the junction element 5. A holding plate 20 of the impact-absorbing damper 15 rests against the exterior side of the vertical wall 19. The bumper arrangement which is connected with the impact-absorbing damper 15 is not shown in detail.

The two webs 11, 12 and 13, 14 of each hollow-section portion 9 and 10 extend approximately at a right angle with respect to one another and an angle α of approximately 45° with respect to a horizontal auxiliary plane A—A.

An imaginary extension of all webs 11, 12, 13, 14 leads to the center point M1 of the central tube portion 8.

The two outer hollow-section portions 9, 10 in the illustrated embodiment, viewed in cross-section, have an approximately square design. However, the hollow-section portions 9, 10 may also have a rectangular cross-section. Corresponding to FIG. 3, the outer hollow-section portions 9, 10 have a slightly larger width than the central tube portion 8; i.e., the hollow-section portions 9, 10 project beyond the tube portion 8 toward both transverse sides.

The lateral boundary edges 21, 22 of the side member 3 taper (according to FIG. 3) continuously in the downward direction, specifically from the width B1 to the width B2. However, in another embodiment the two boundary edges 21, 22 are arranged in parallel to one another.

On the upper hollow-section portion 9, a continuous undercut longitudinal groove 24 is provided on the side facing the engine space 23, into which threaded plates for the fastening of assemblies or the like can be inserted which are not shown locally. All wall portions of the side member 3 manufactured by the extrusion molding method have a constant material thickness which is a function of the required energy absorption and the possibilities of the extrusion molding techniques.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A member of a vehicle body structure, said member being formed by an extruded section made of a light metal, comprising:
    a central tube portion, including means for receiving a portion of an impact absorbing damper of a bumper arrangement;
    at least two outer hollow-section portions arranged on substantially opposite sides of the tube portion; and diagonally extending webs connected between the hollow-section portions and the tube portion.

2. A member according to claim 1, wherein the central tube portion has a substantially circular cross-section.

3. A member according to claim 1, wherein each hollow-section portion is coupled to two of the webs, and the two webs of each hollow-section portion extend approximately at a right angle with respect to one another.

4. A member according to claim 1, wherein each web extends at an angle of approximately 45° with respect to a horizontal auxiliary plane.

5. A member according to claim 1, wherein an imaginary extension of each web intersects the center point of the tube portion.

6. A member according to claim 1, wherein the two hollow-section portions have an approximately square cross-section.

7. A member according to claim 1, wherein all wall portions of the extruded section have a constant material thickness.

8. A member according to claim 1, wherein the two outer hollow-section portions have a larger width than the central tube portion.

9. A member according to claim 1, wherein the lateral boundary edges of the member taper continuously in the downward direction.

10. A member according to claim 1, wherein the member is a side member of a vehicle body structure.

11. A member according to claim 10, wherein the central tube portion has a circular cross-section.

12. A member according to claim 10, wherein each hollow-section portion is coupled to two of the webs, and the two webs of each hollow-section portion extend approximately at a right angle with respect to one another.

13. A member according to claim 10, wherein each web extends at an angle of approximately 45° with respect to a horizontal auxiliary plane.

14. A member according to claim 10, wherein an imaginary extension of each web intersects the center point of the tube portion.

15. A member according to claim 10, wherein the two hollow-section portions have an approximately square cross-section.

16. A member according to claim 10, wherein all wall portions of the extruded section have a constant material thickness.

17. A member according to claim 10, wherein the two outer hollow-section portions have a larger width than the central tube portion.

18. A member according to claim 10, wherein the lateral boundary edges of the member taper continuously in the downward direction.

* * * * *